(12) United States Patent
Powell et al.

(10) Patent No.: US 9,284,919 B2
(45) Date of Patent: Mar. 15, 2016

(54) FLUID TEMPERATURE STABILIZATION SYSTEM

(75) Inventors: Patrick Powell, Farmington Hills, MI (US); Robert Cardno, Novi, MI (US)

(73) Assignee: Denso International America, Inc., Southfield, MI (US)

( * ) Notice: Subject to any disclaimer, the term of this patent is extended or adjusted under 35 U.S.C. 154(b) by 1295 days.

(21) Appl. No.: 12/973,120

(22) Filed: Dec. 20, 2010

(65) Prior Publication Data

US 2011/0240249 A1  Oct. 6, 2011

Related U.S. Application Data

(60) Provisional application No. 61/319,815, filed on Mar. 31, 2010.

(51) Int. Cl.
| | | |
|---|---|---|
| F02M 25/07 | (2006.01) | |
| F28D 20/02 | (2006.01) | |
| F02B 29/04 | (2006.01) | |

(52) U.S. Cl.
CPC ....... *F02M 25/0707* (2013.01); *F02M 25/0709* (2013.01); *F02M 25/0718* (2013.01); *F02M 25/0728* (2013.01); *F02M 25/0731* (2013.01); *F02M 25/0732* (2013.01); *F02M 25/0737* (2013.01); *F28D 20/021* (2013.01); *F02B 29/0406* (2013.01); *Y02E 60/145* (2013.01); *Y02T 10/121* (2013.01)

(58) Field of Classification Search
CPC ............ F02M 25/0709; F02M 25/745; F02M 25/0734; F02M 25/0707; F02M 25/0718; F28D 20/02

USPC ......... 123/568.11, 568.18, 568.2; 165/10, 41, 165/42, 67, 104.17; 60/272, 320
See application file for complete search history.

(56) References Cited

U.S. PATENT DOCUMENTS

| | | | |
|---|---|---|---|
| 4,248,291 A * | 2/1981 | Jarmul ................... | F28D 20/02 126/640 |
| 4,609,036 A | 9/1986 | Schrader | |
| 4,613,444 A | 9/1986 | Lane et al. | |
| 5,662,161 A * | 9/1997 | Hughes et al. .................. | 165/10 |
| 5,953,917 A * | 9/1999 | Murphy et al. .............. | 60/641.8 |
| 2001/0045090 A1* | 11/2001 | Gray, Jr. .......................... | 60/278 |
| 2002/0000306 A1* | 1/2002 | Bradley .......................... | 165/10 |
| 2003/0037774 A1* | 2/2003 | Schweinzer et al. ...... | 123/568.12 |
| 2003/0131623 A1* | 7/2003 | Suppes ........................ | 62/324.1 |
| 2006/0225863 A1* | 10/2006 | Levin .............................. | 165/10 |
| 2007/0227160 A1* | 10/2007 | Johnson ......................... | 62/50.2 |
| 2007/0289582 A1* | 12/2007 | Elsasser et al. .......... | 123/568.21 |
| 2008/0092539 A1* | 4/2008 | Marshall et al. ................ | 60/599 |
| 2008/0133110 A1 | 6/2008 | Vetrovec | |

(Continued)

OTHER PUBLICATIONS

Shoemaker, Michael, Dow Automotive Market Development Manager; Dow Automotive Thermal Energy Storgage System (TESS) (14pp).

*Primary Examiner* — Lindsay Low
*Assistant Examiner* — George Jin
(74) *Attorney, Agent, or Firm* — Harness, Dickey & Pierce, P.L.C.

(57) ABSTRACT

A fluid temperature stabilization system may employ an exterior casing defining an internal cavity, one or more phase change material may be located within the internal cavity. A fluid inlet may be located at a first end of the casing providing access into the internal cavity, and an outlet may be located at a second end of the casing providing fluid access from the internal cavity.

19 Claims, 6 Drawing Sheets

(56) References Cited

U.S. PATENT DOCUMENTS

2008/0230203 A1* 9/2008 Christ et al. .................... 165/10
2009/0013978 A1* 1/2009 Joergl et al. .............. 123/568.12
2010/0263375 A1* 10/2010 Grieve ........................... 60/612
2011/0048388 A1* 3/2011 Takahashi et al. ....... 123/568.11
2011/0297346 A1* 12/2011 Minta et al. .................... 165/10

* cited by examiner

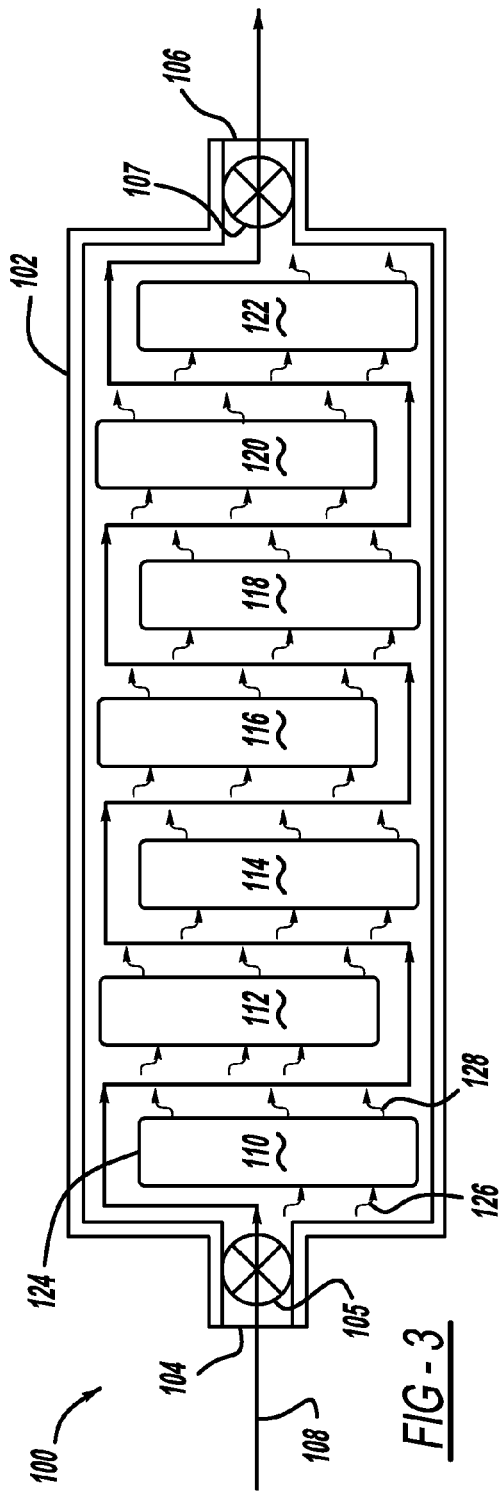
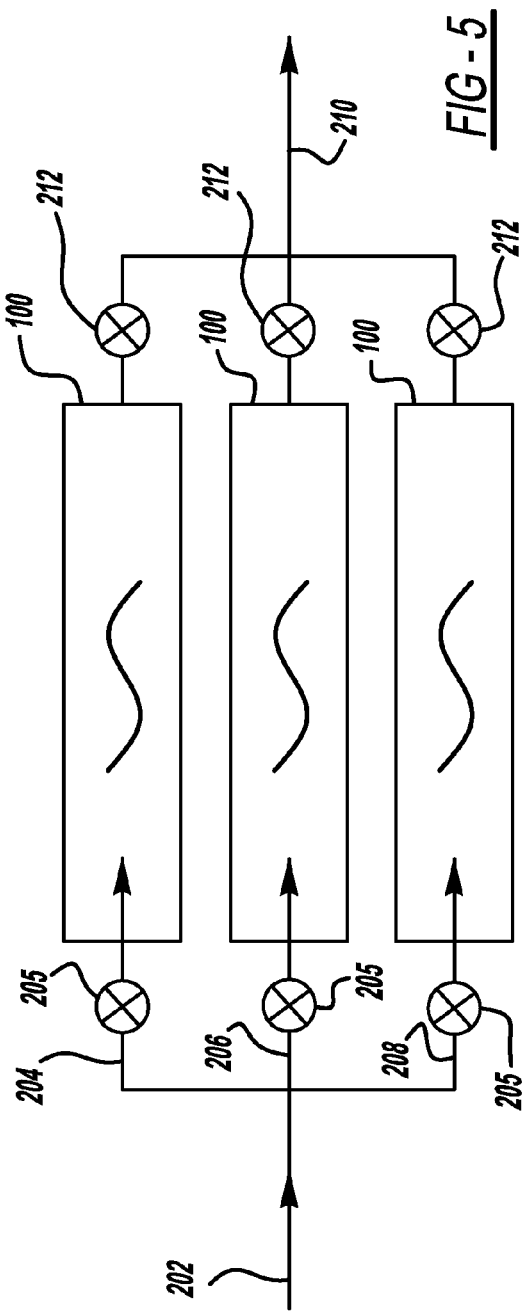
FIG-3
FIG-5

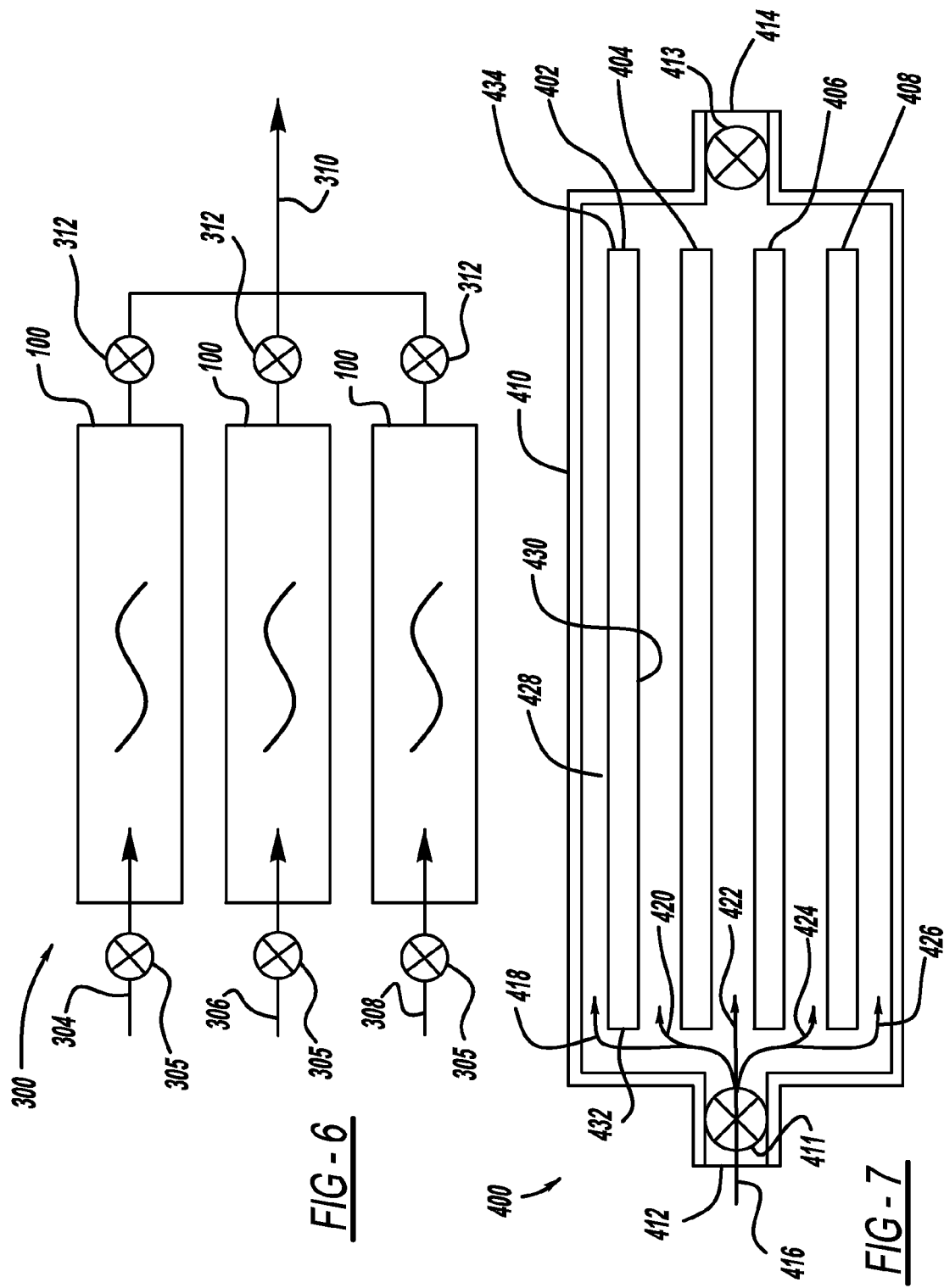

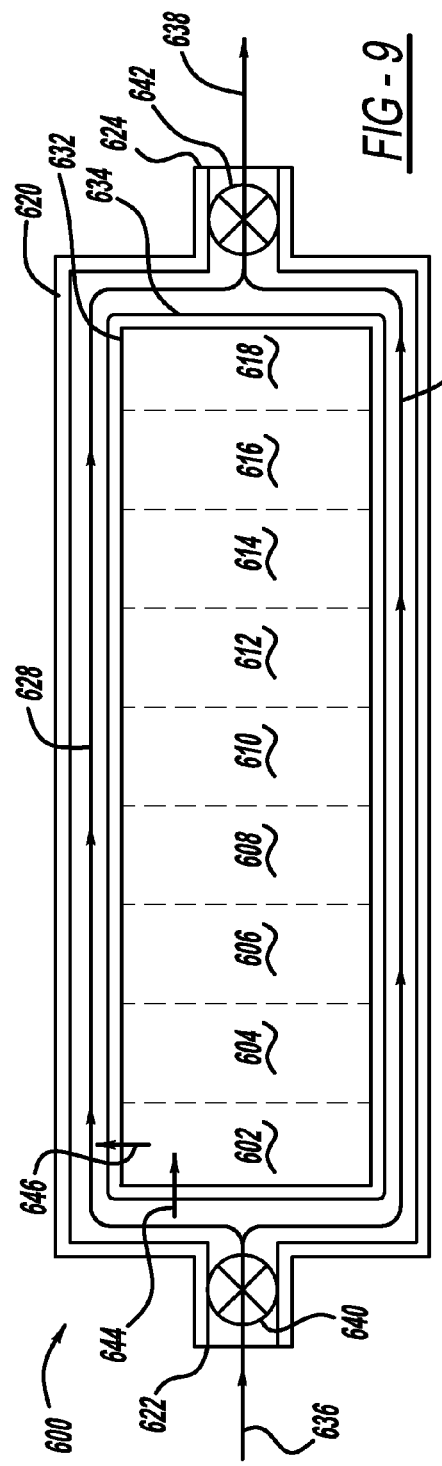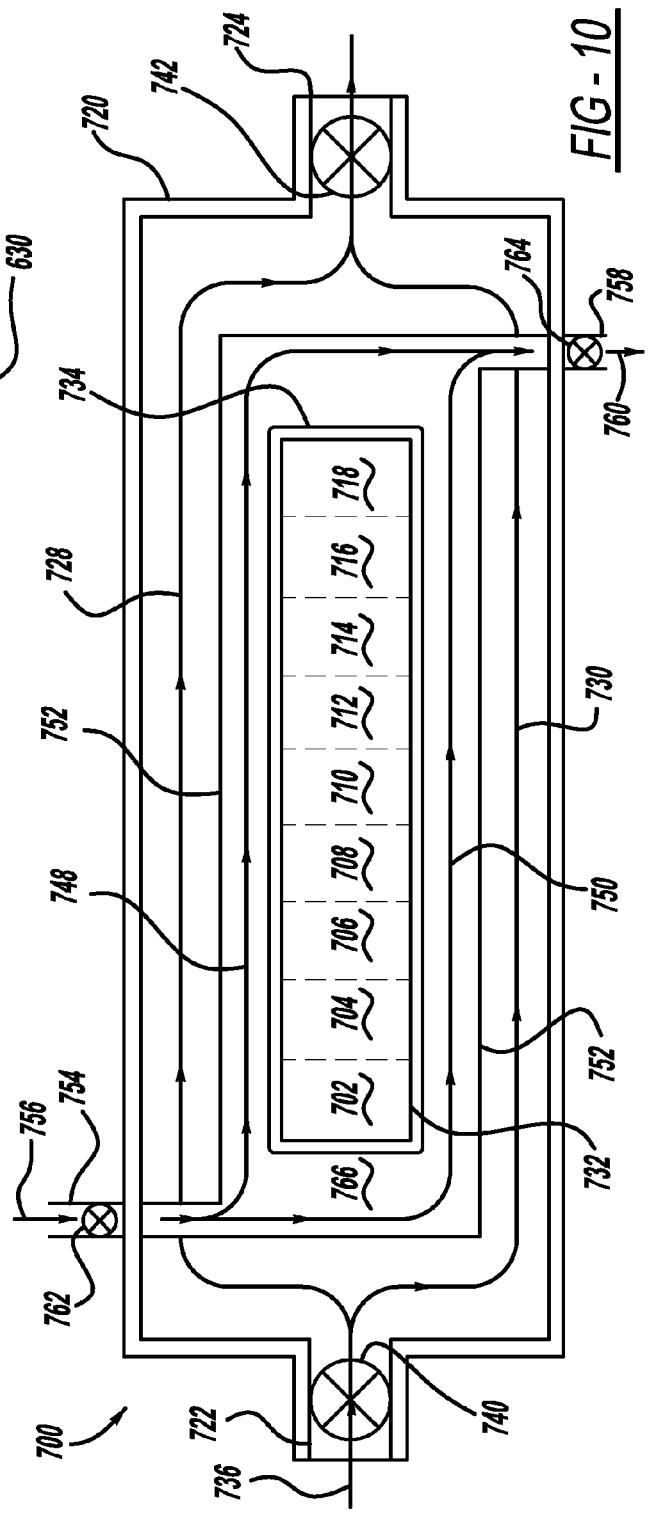

FLUID TEMPERATURE STABILIZATION SYSTEM

This application claims the benefit of U.S. Provisional Application No. 61/319,815 filed on Mar. 31, 2010. The entire disclosure of U.S. Provisional Application No. 61/319,815 is incorporated herein by reference.

FIELD

The present disclosure relates to an apparatus to stabilize fluid temperatures.

BACKGROUND

This section provides background information related to the present disclosure which is not necessarily prior art. Modern vehicles may be equipped with a system to lower a temperature of a fluid. One example of such a system is an exhaust gas recirculation system of an internal combustion engine. More specifically, an air to fuel mixture within a combustion chamber may have its temperature lowered by introducing post-combustion exhaust into intake air that is subsequently utilized in the combustion chamber. While systems that lower fluid temperatures have been satisfactory for prescribed applications, a need exists to more reliably reduce temperatures of a fluid.

SUMMARY

This section provides a general summary of the disclosure, and is not a comprehensive disclosure of its full scope or all of its features.

A fluid temperature stabilization system may employ an exterior casing defining an internal cavity, a plurality of phase change materials located within the internal cavity, an inlet located at a first end of the casing providing access into the internal cavity, and an outlet located at a second end of the casing providing access from the internal cavity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a schematic view of a fluid temperature stabilization system in accordance with the teachings of the present disclosure;

FIG. 5 is a schematic view of a fluid temperature stabilization system in accordance with the teachings of the present disclosure;

FIG. 6 is a schematic view of a fluid temperature stabilization system in accordance with the teachings of the present disclosure;

FIG. 7 is a schematic view of a fluid temperature stabilization system in accordance with the teachings of the present disclosure;

FIG. 9 is a schematic view of a fluid temperature stabilization system in accordance with the teachings of the present disclosure; and FIG. 10 is a schematic view of a fluid temperature stabilization system in accordance with the teachings of the present disclosure.

Corresponding reference numerals indicate corresponding parts throughout the several views of the drawings.

DETAILED DESCRIPTION

Figure 1:
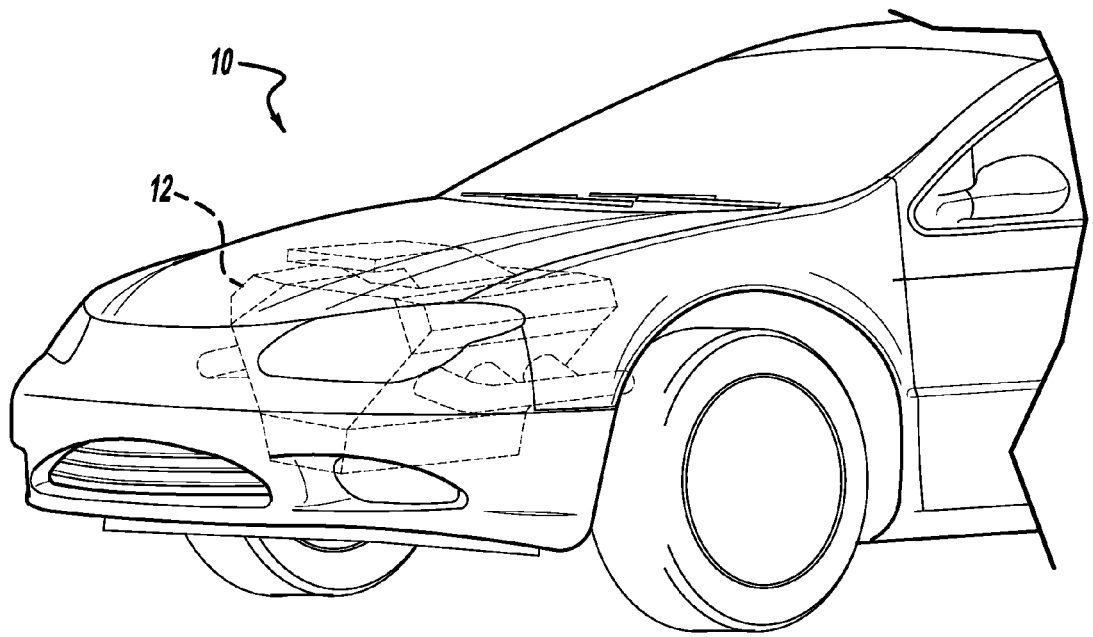
FIG. 1 is a perspective view of a vehicle depicting a location of an engine and a fluid temperature stabilization system in accordance with teachings of present disclosure.

Example embodiments will now be described more fully with reference to FIGS. 1-10 of the accompanying drawings. FIG. 1 depicts a vehicle 10 within which an engine 12 may reside. Engine 12 and its associated fluid systems may employ a phase change material ("PCM") to regulate or stabilize a temperature of a fluid, such as a liquid or gaseous fluid.

Figure 2:
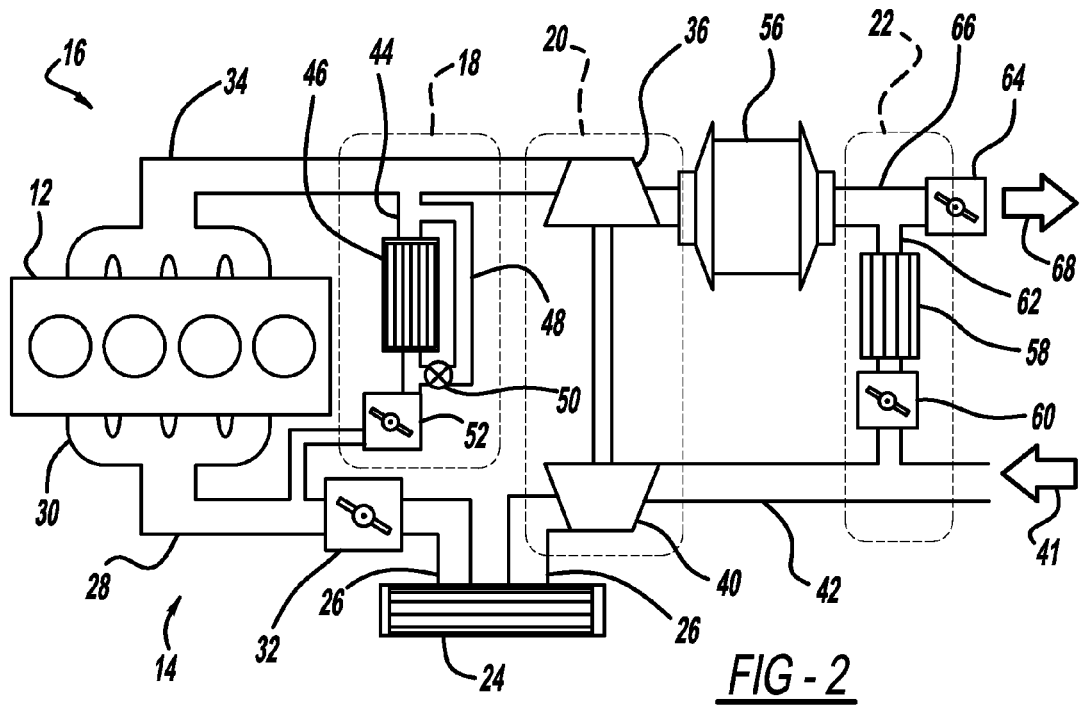
FIG. 2 is a diagram of an engine intake and exhaust system depicting use of fluid temperature coolers in accordance with teachings of the present disclosure.

Turning now to FIG. 2, engine 12 may be equipped with an intake system 14 and an exhaust system 16. Moreover, other components may be utilized by intake system 14 and exhaust system 16. More specifically, intake system 14 may utilize an exhaust gas recirculation system ("EGRS") 18, a turbocharger 20, a low pressure exhaust gas recirculation system ("LPEGRS") 22, and a charge air cooler 24, which may be located in an intake pipe 26 between turbocharger 20 and a manifold feed pipe 28, which directs air into an intake manifold 30. A valve 32 located in intake pipe 26 immediately after charge air cooler 24, may regulate air permitted to flow into manifold feed pipe 28.

Some components and systems may actually be shared between intake system 14 and exhaust system 16. For example, turbocharger 20 may receive energy from the force of combustion exhaust gases passing through an exhaust pipe 34 by using an exhaust turbine or fan 36 and then continuously transmit acquired rotational energy via a shaft 38 to an intake turbine or fan 40, which compresses fresh intake air 41 drawn to intake fan 40 through a low pressure intake pipe 42. Another component that is shared between intake system 14 and exhaust system 16 is EGRS 18. More specifically, EGRS 18 may receive exhaust gases expelled from exhaust pipe 34 via an EGRS intake pipe 44. Upon entering EGRS intake pipe 44, exhaust gases may be divided and flow into a fluid temperature stabilizer located at location 46 or into an EGRS bypass pipe 48 to permit some exhaust gases to bypass the fluid temperature stabilizer located at location 46. To restrict or prevent exhaust gases flowing into EGRS bypass pipe 48, a valve 50 located along EGRS bypass pipe 48 may be adjusted from a wide open position to a closed position, or any intermediary position. To restrict or prevent exhaust gases from flowing into EGRS intake pipe 44, and as a result, also into EGRS bypass pipe 48 and the fluid temperature stabilizer located at location 46, a valve 52 may be adjusted from a wide open position to a closed position, or any intermediary position.

With continued reference to FIG. 2, another system that may be shared between intake system 14 and exhaust system 16 is LPEGRS 22 or the low pressure EGRS. LPEGRS 22 may be located downstream from all other exhaust components, such as a diesel particulate filter 56, which may be utilized on some exhaust systems such as diesel systems, turbocharger 20, and any EGRS that is located immediately aft of the exhaust manifold, for instance. LPEGRS 22 may be equipped with a fluid temperature stabilizer at location 58 and an exhaust valve 60. A single cross-flow exhaust pipe 62 may fluidly link low pressure portion of exhaust pipe 34 and low pressure intake pipe 42; however, to increase back pressure in exhaust pipe 34, an end valve 64 located at an end of tail pipe 66 may be adjusted to restrict exhaust flow to vary pressure within tail pipe 66 and exhaust pipe 34 and also limit exhaust emissions 68 from tail pipe 66. Thus, fluid temperature stabilizer at location 46 may be a high pressure fluid temperature stabilizer and fluid temperature stabilizer at location 58 may be a low pressure fluid temperature stabilizer depending upon how valves 32, 52, 60, 64 are adjusted.

Turning now to FIG. 3, an enlarged view of a first embodiment of a fluid temperature stabilizer 100 is depicted. Fluid temperature stabilizer 100 may be used as a high pressure fluid temperature stabilizer, such as fluid temperature stabilizer located at location 46, or a low pressure fluid temperature stabilizer, such as fluid temperature stabilizer located at location 58. Fluid temperature stabilizer 100 may employ an exterior case 102 having a single fluid inlet 104 and a single fluid outlet 106 such that a fluid 108 may pass into and out of exterior case 102. As depicted in FIG. 3, fluid 108 may make a circuitous route through exterior case 102, such as around locations 110, 112, 114, 116, 118, 120, 122 which may be occupied by a PCM enclosed within a casing 124, which may be steel, aluminum or other suitable material capable of withstanding cyclical cooling and heating and contact with the PCM within casing 124. When fluid 108 enters exterior case 102, heat 126 may pass through casing 124 and into the PCM that occupies location 110, for example. Heat 126 may be absorbed by the PCM at location 110 when fluid 108 entering is at a temperature greater than the PCM at location 110 and heat 128 may be expelled from the PCM and absorbed by fluid 108 when the PCM at location 110 is at a temperature greater than fluid 108.

Examples of PCMs that may be utilized with the present disclosure include those made of salt hydrates, fatty acids and esters, and various paraffins (e.g., octadecane). Because PCMs work on the principle of "Passive Cooling," they may absorb heat while melting into a liquid and release heat when solidifying. Thus, PCMs may undergo a sequence of operations a repeated number of times. For instance, solid PCM may be heated and change phase to liquid at a melting point phase. The PCM may absorb a certain amount of heat while the temperature of the PCM may stay constant, even though a phase change is taking place. In a reverse process, the PCM material may change phase from liquid to solid such that the stored latent heat may be released at a constant temperature. PCMs are available in a wide range of temperatures, for example, from −5 up to 190 degrees C., and specific PCMs may store anywhere from 5 to 14 times more heat per unit volume than other known materials, (e.g. water).

Returning to FIG. 3, because PCMs may be made of various materials and may be designed to absorb and expel heat at prescribed temperatures, which are coincident with a phase change of the specific PCM, a variety of PCMs may be utilized in a specific application in accordance with the teachings of the present disclosure. Thus, exterior case 102 may contain different types of PCM within each of locations 110, 112, 114, 116, 118, 120, 122, so that energy by at least one PCM may be absorbed and expelled over a wide operational range of temperatures of fluid 108, which may be exhaust 68 from engine 12. FIG. 3 also depicts an inlet valve 105 just aft of inlet 104 and an outlet valve 107 just prior to outlet 106. Valves 105, 107 may be used to govern fluid flow into, through and from (i.e. out of) exterior case 102. More specifically, valve 105 may be opened or closed to varying degrees to prevent or permit a fluid to flow into inlet 104. Similarly, valve 107 may be opened or closed to varying degrees to prevent or permit a fluid to flow from outlet 106. Valves 105, 107 may be simultaneously controlled to govern fluid flow through casing 102.

Figure 4:
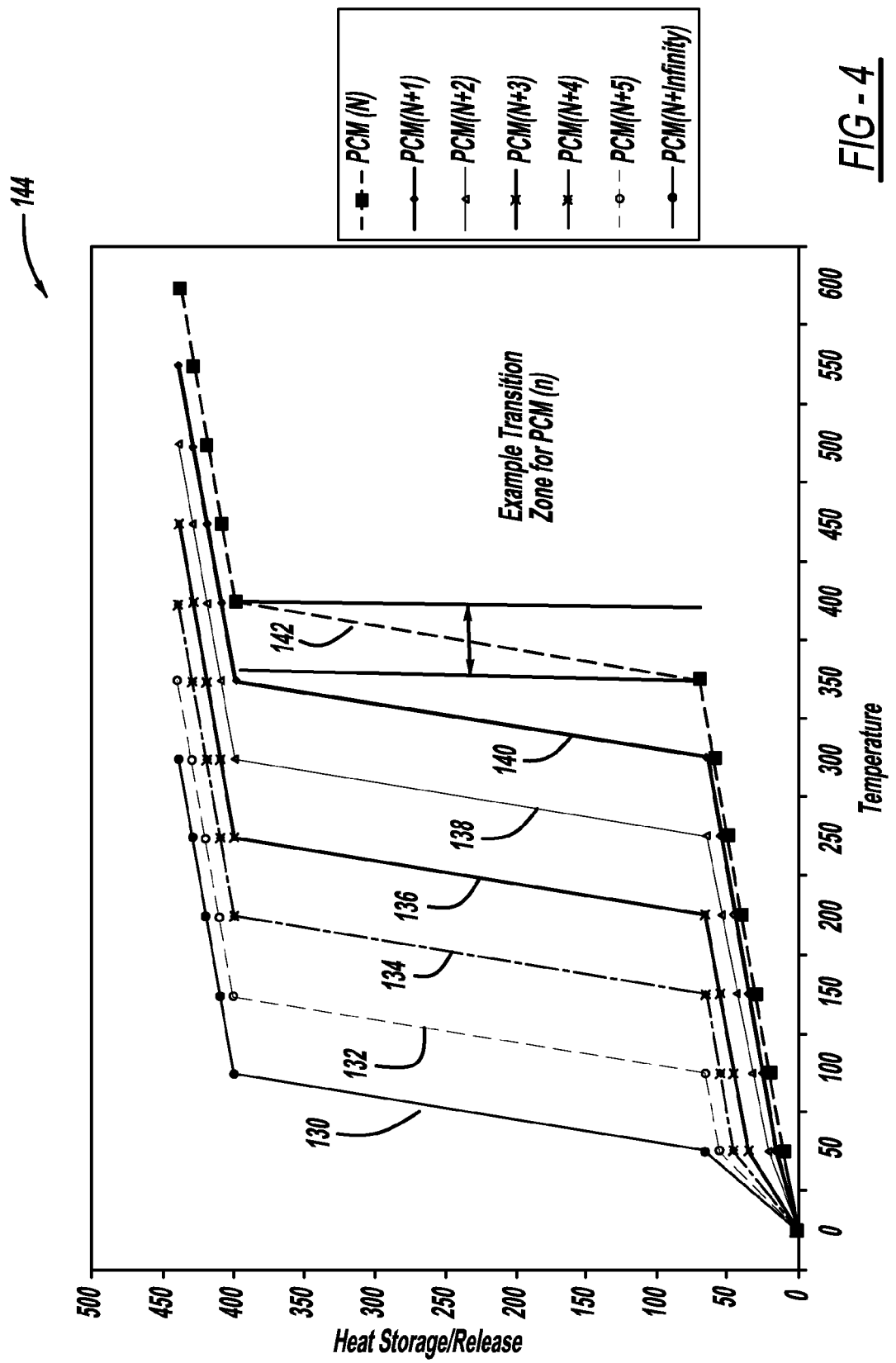
FIG. 4 is a graph depicting examples of heat storage and release characteristics of various phase change materials across a broad temperature range.

Turning to FIG. 4, a graph 144 depicts examples of how different PCMs 130, 132, 134, 136, 138, 140, 142 may thermally perform if installed within exterior case 102, for example. Heat (Kjoules) may be largely absorbed/expelled between 50-100 degrees C. for PCM 130, between 100-150 degrees C. for PCM 132, between 150-200 degrees C. for PCM 134, between 200-250 degrees C. for PCM 136, between 250-400 degrees C. for PCM 138, between 400-350 degrees C. for PCM 140 and between 350-500 degrees C. for PCM 142.

Turning to FIG. 5, another arrangement of a fluid temperature stabilizer 200 is depicted employing a parallel arrangement of fluid temperature stabilizers 100. With the arrangement of FIG. 5, a higher quantity of heat may be absorbed than with a single fluid temperature stabilizer 100. As depicted, a single branch of fluid 202 may be divided into three branches 204, 206, 208 before merging again into a single branch of fluid 210. Thus, between branch of fluid 202 and branch of fluid 210, energy may be absorbed and expelled by each fluid temperature stabilizer 100 depending upon a temperature and flow rate of fluid 202. Valves 212 may be located at the exits of branches 204, 206, 208 to control flow to maintain a prescribed temperature (e.g., 20 degrees C.). FIG. 5 also depicts numerous inlet valves 205, such as one inlet valve 205 attached to each of branches 204, 206, 208. Similar to valves 212 located at an exit end of each of branches 204, 206, 208, the volume of fluid entering each of fluid temperature stabilizer 100 may be controlled, which permits the amount of energy (e.g. heat) being absorbed or expelled by fluid temperature stabilizer 100.

Referring now to FIG. 6, another arrangement of a fluid temperature stabilizer 300 is depicted employing a parallel arrangement of fluid temperature stabilizers 100. With the arrangement of FIG. 6, a higher quantity of heat may be absorbed than with a single fluid temperature stabilizer 100. As depicted, multiple branches of fluid 304, 306, 308 entering from separate sources may be combined into a single branch of fluid 310. Thus, between branches of fluid 304, 306, 308 and branch of fluid 310, energy may be absorbed and expelled by each fluid temperature stabilizer 100 depending upon a temperature and flow rate of entering fluid. Valves 312 may be located at the exits of branches 304, 306, 308 to control flow to maintain a prescribed temperature (e.g., 20 degrees C.). FIG. 6 also depicts numerous inlet valves 305, such as one inlet valve 305 attached to each of branches 304, 306, 308. Similar to valves 312 located at an exit end of each of branches 304, 306, 308, the volume of fluid entering each of fluid temperature stabilizer 100 may be controlled, which permits the amount of energy (e.g. heat) being absorbed or expelled by fluid temperature stabilizer 100.

Turning to FIG. 7, another arrangement of a fluid temperature stabilizer 400 is depicted employing a parallel arrangement of PCMs. More specifically, PCMs 402, 404, 406, 408 may be located within a housing or case 410 with their longitudinal axes arranged parallel to each other with fluid flow also flowing parallel to such longitudinal lengths. PCMs 402, 404, 406, 408 may be made of the same phase change material or made of different phase change materials. Moreover, a length of any of PCMs 402, 404, 406, 408 may be longer than its width or thickness. Similar to fluid temperature stabilizer 100 depicted in FIG. 3, case 410 may have a single inlet 412 and a single outlet 414. With such an arrangement, a single flow path of an entering fluid 416, such as a liquid or gas, may then expand into multiple flow paths 418, 420, 422, 424, 426 to flow around all external surfaces of PCMs 402, 404, 406, 408. As a more specific example, flow path 418 may direct fluid flow along a longitudinal side 428 of PCM 402 and flow path 420 may direct fluid flow along a different longitudinal side 430 of PCM 402. Of course, because flow paths 418, 420 depict general directions of a fluid, such fluid may flow around to different longitudinal sides and become mixed, thereby managing to flow over and contact all four longitudinal sides of a single PCM 402, for example. In flowing over and against all four longitudinal sides, ends 432, 434 will also be subjected to flowing fluid. Thus, with all surfaces of PCM 402 being subjected to flowing fluid, PCM 402 may absorb and expel thermal energy in accordance with the specific properties of PCM 402. A similar explanation for PCM 404, 406, 408 may be made. FIG. 7 also depicts an inlet valve 411 just aft of inlet 412 and an outlet valve 413 just prior to outlet 414. Valves 411, 413 may be used to govern fluid flow into, through and from (i.e. out of) exterior case 410. More specifically, valve 411 may be opened or closed to varying degrees to prevent or permit a fluid to flow into inlet 412. Similarly, valve 413 may be opened or closed to varying degrees to prevent or permit a fluid to flow from outlet 414. Valves 411, 413 may be simultaneously controlled to govern fluid flow through casing 410.

Figure 8:
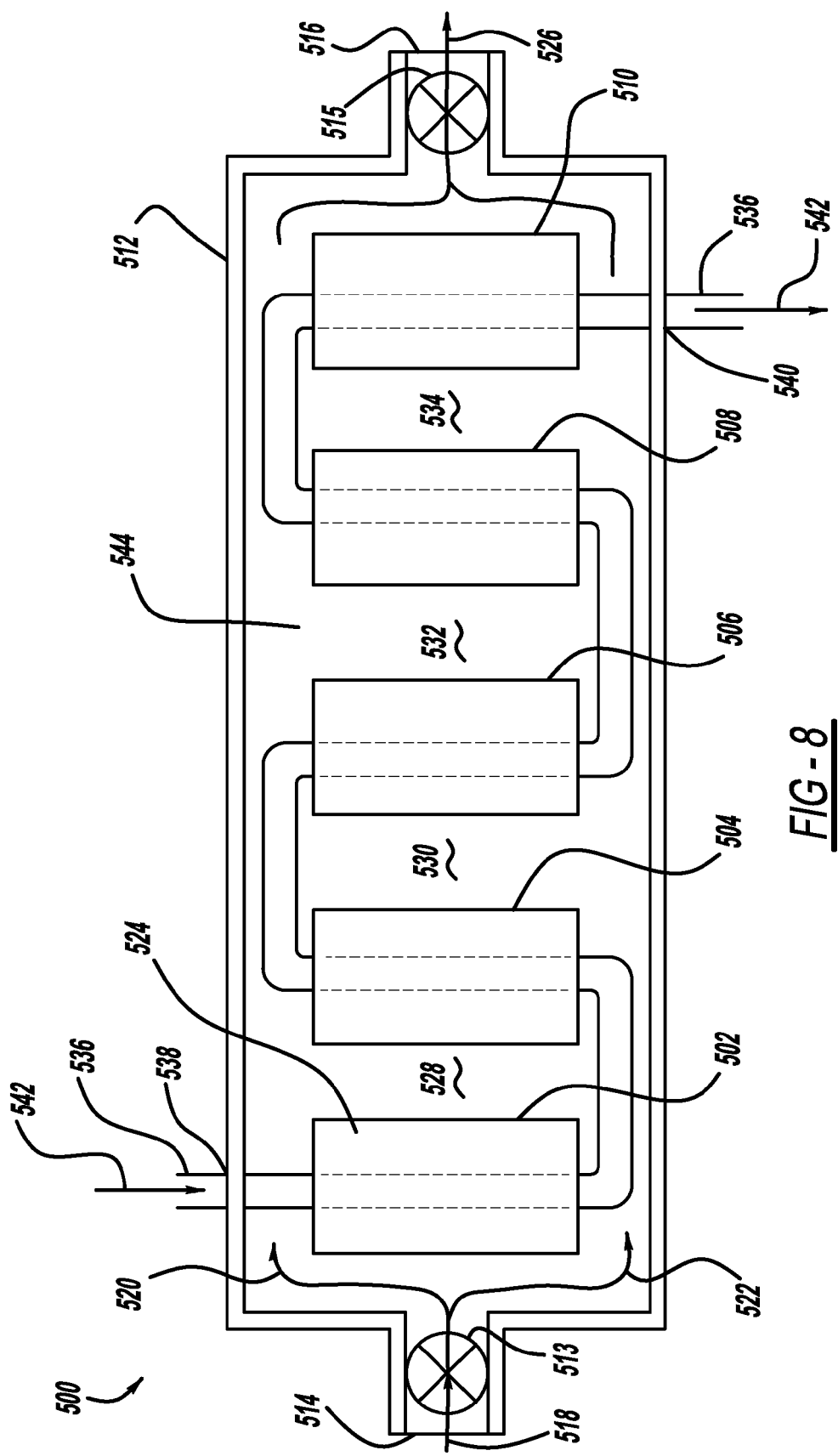
FIG. 8 is a schematic view of a fluid temperature stabilization system in accordance with the teachings of the present disclosure.

Turning to FIG. 8, another arrangement of a fluid temperature stabilizer 500 is depicted employing a parallel arrangement of PCMs. More specifically, PCMs 502, 504, 506, 508, 510 may be located within a housing or case 512 and may be made of the same or different phase change material. Moreover, PCMs 502, 504, 506, 508, 510 may be arranged such that their longitudinal lengths are parallel to each other. Similar to fluid temperature stabilizer 100 depicted in FIG. 3, case 512 may have an inlet 514 and an outlet 516 for a flow path of an entering fluid 518, such as a liquid or gas, which may then expand into multiple flow paths 520, 522 to flow around all external surfaces of PCMs 502, 504, 506, 508, 510. More specifically, as an example, single inlet flow path of fluid 518 may be divided into multiple flow paths, such as flow paths 520, 522 to direct fluid flow around an entire external surface 524 of PCM 502 and subsequent PCMs by flowing into a space 528, which is between PCMs 502 and 504, a space 530, which is between PCMs 504 and 506, a space 532, which is between PCMs 506 and 508, and a space 534, which is between PCMs 508 and 510, before being re-concentrated into a single flow path of fluid 526 and exiting at outlet 516. Thus, with all surfaces of PCMs 502, 504, 506, 508, 510 being subjected to flowing fluid over their exterior surfaces, PCMs 502, 504, 506, 508, 510 may absorb and expel thermal energy in accordance with their specific energy absorption and expulsion properties, which may all be different among the different PCMs utilized. FIG. 8 also depicts an inlet valve 513 just aft of inlet 514 and an outlet valve 515 just prior to outlet 516. Valves 513, 515 may be used to govern fluid flow into, through and from (i.e. out of) exterior case 512. More specifically, valve 513 may be opened or closed to varying degrees to prevent or permit a fluid to flow into inlet 514. Similarly, valve 515 may be opened or closed to varying degrees to prevent or permit a fluid to flow from outlet 516. Valves 513, 515 may be simultaneously controlled to govern fluid flow through casing 512.

Continuing with FIG. 8, a flow tube 536 may be resident within case 512. More specifically, flow tube 536 may pass through case 512 at a first location 538 and a second location 540. Flow tube 536 may contain and transport a fluid 542, such as a liquid or gas through an internal cavity 544 of case 512, but more specifically, through each of PCMs 502, 504, 506, 508, 510. Because fluid 542 may be a different fluid and in a different phase than fluid 518 entering inlet 514, PCMs 502, 504, 506, 508, 510 may be used to absorb thermal energy from fluid 542 and release thermal energy into fluid 542, depending upon a temperature of fluid 542 and PCMs 502, 504, 506, 508, 510, and vice versa (e.g., absorb thermal energy from fluid 518 and release thermal energy to fluid 542).

As depicted in FIG. 8, flow tube 536 may pass through internal cavity 544 of case 512 in a serpentine manner so that flow tube 536 may pass through each PCM 502, 504, 506, 508, 510 in a manner coincident with a central, longitudinal axis of each PCM 502, 504, 506, 508, 510 for maximum thermal benefit associated with each PCM.

Turning to FIG. 9, another arrangement of a fluid temperature stabilizer 600 is depicted employing a parallel arrangement of PCM devices. More specifically, PCMs 602-618 may be located within a housing or case 512 and may each be made of the same or different phase change material. Moreover, PCMs 602-618 may be arranged such that their longitudinal lengths are parallel to each other. Similar to fluid temperature stabilizer 100 depicted in FIG. 3, case 620 may have an inlet 622 and an outlet 624 that is used as a flow path of an entering fluid 626, such as a liquid or gas, which may then expand into multiple flow paths 628, 630 to flow around all external surfaces 632 of PCMs 628-630. PCMs 628-630 may be enclosed within a casing 634. Thus, flow paths 628, 630 may flow between casing 620 and casing 634. Alternatively, if casing 634 is not present, flow paths 628, 630 may flow between casing 620 and PCMs 628-630. As an example, single inlet flow path of fluid 636 may be divided into multiple flow paths 628, 630 to direct fluid flow around an entire external surface 632 of PCMs 628-630, before being reconcentrated into a single flow path of fluid 638 and exiting at outlet 624. An inlet valve 640 may control a flow of fluid into fluid temperature stabilization device 600 and an outlet valve 642 may control a flow of fluid out of or from fluid temperature stabilization device 600. Inlet valve 640 may be located at an inlet 622, such as before flow paths 628, 630 are formed and outlet valve 64 may be located at an outlet 624, such as after flow paths 628, 630 are joined. More specifically, inlet valve 640 may be opened or closed to varying degrees to prevent or permit a fluid to flow into inlet 622. Similarly, outlet valve 642 may be opened or closed to varying degrees to prevent or permit a fluid to flow from outlet 624. Valves 640, 642 may be simultaneously controlled to govern fluid flow through casing 620.

Thus, with all surfaces of PCMs 602-618 being subjected to flowing fluid over their exterior surfaces, PCMs 602-618 may absorb and expel thermal energy in accordance with their specific energy absorption and expulsion properties, which may be different for each of the different PCMs 602-618 utilized. More specifically, casing 634 may be steel, aluminum or other suitable material capable of withstanding cyclical cooling and heating and contact with the PCMs 602-618 within casing 634. When fluid enters exterior case 620, heat 644 may pass through casing 634 and into one or more PCM that occupies locations within casing 634, for example. Heat 644 may be absorbed by PCM 602 when fluid 108 entering case 620 is at a temperature greater than PCM 602 and heat 646 may be expelled from PCM 602 and absorbed by fluid utilizing flow path 628 when PCM 602 is at a temperature greater than such fluid.

Turning to FIG. 10, another arrangement of a fluid temperature stabilizer 700 is depicted employing a parallel arrangement of PCM devices. More specifically, PCMs 702-718 may be located within a housing or case 734 and may each be made of the same or different phase change material. Moreover, PCMs 702-718 may be arranged such that their longitudinal lengths are parallel to each other. Similar to fluid temperature stabilizer 100 depicted in FIG. 3, case 720 may have an inlet 722, which may be used as part of a flow path 736 for an entering fluid, such as a liquid or gas, which may then expand into multiple flow paths 728, 730 to flow around all external surfaces 732 of PCMs 702-718 toward an outlet 724, which may be used as part of a flow path 738 when fluid exits. As an example, single inlet flow path 736 may be divided into multiple flow paths 728, 730 to direct fluid flow around an entire external surface 732 of PCMs 702-718, before being reconcentrated into a single flow path 738 and exiting at outlet 724. An inlet valve 740 may control a flow of fluid into fluid temperature stabilization device 700 and an outlet valve 742 may control a flow of fluid out of or from fluid temperature stabilization device 700. Inlet valve 740 may be located at an inlet 722, such as before flow paths 728, 730 are formed, and outlet valve 742 may be located at an outlet 724, such as after flow paths 728, 730 are joined. More specifically, inlet valve 740 may be opened or closed to varying degrees to prevent or permit a fluid to flow into inlet 722. Similarly, outlet valve 742 may be opened or closed to varying degrees to prevent or permit a fluid to flow from outlet 724. Valves 740, 742 may be simultaneously controlled to govern fluid flow through casing 720. PCMs 702-718 may be enclosed within a casing 734 such that casing 734 may contact PCMs 702-718. Thus, flow paths 728, 730 may flow around and between casing 720 and casing 734. Alternatively, if casing 734 is not present, in which case PCMs 702-718 may be exposed to fluid in a surrounding flow path(s), flow paths 728, 730 may flow between casing 720 and PCMs 702-718. Still yet, PCMs 702-718 may reside in contact with their immediate casing 734, which may then be surrounded by a fluid in fluid paths 748, 750, which may be enclosed within another casing 752.

Continuing with FIG. 10, casing 734 may actually surround and contact PCMs 702-718. Flow paths 748, 750 may surround casing 734 and be fed by a single inlet 754, which is different from inlet 722. Flow path 756 that passes through inlet 754, may divide into multiple flow paths 748, 750 and flow over and around exterior of casing 734 before joining and exiting casing 752 at outlet 758 as flow path 760. Entry of fluid via flow path 756 at inlet 754 may be controlled from no entry to some predetermined flow rate, by valve 762, and exit of fluid via flow path 760 at outlet 758 may be controlled from no flow rate to some predetermined flow rate, by valve 764.

Inlet 754 may permit fluid to flow into internal cavity 766 surrounding casing 734, within which PCMs 702-718 may reside. Inlet 754 may pass through a wall of casing 720 at a first location and outlet 758 may pass through a wall of casing 720 at a different, second location. Cavity 766, which is fed by inlet 754 may contain and transport a fluid, such as a liquid or gas, around casing 734, within which each of PCMs 702-718 may reside. Because fluid entering at inlet 754 may be a different fluid and in a different phase than fluid entering at inlet 722, PCMs 702-718 may be used to absorb thermal energy from or release thermal energy to fluid of flow paths 748, 750, which may then respectively release thermal energy or absorb thermal energy from fluid of flow paths 728, 730. Temperature of fluids in flow paths 748, 750, in flow paths 728, 730, and of PCMs 702-718 will govern whether energy in terms of heat is absorbed or released between PCMs 702-718 and fluids of flow paths 728, 730, 748, 750 in accordance with heat transfer and thermodynamic principles.

Thus, with all surfaces of PCMs 702-718 being subjected to flowing fluid over their exterior surfaces or exterior surface of casing 734 within which PCMs 702-718 reside, PCMs 702-718 may absorb and expel thermal energy in accordance with their specific energy absorption and expulsion properties, which may be different for each of the different PCMs 702-718 utilized. Casing 734 may be steel, aluminum or other suitable material capable of withstanding cyclical cooling and heating and contact with the PCMs 702-718 within casing 734. In one example of heat absorption, when a fluid enters exterior case 720 through inlet valve 740, heat in fluid of fluid paths 728, 730 may pass through casing 752 and into fluid of flow paths 748, 750, and then through casing 734 and into one or more of PCMs 702-718 that occupy locations within casing 734. In another example, heat also may be expelled by PCMs 702-718 if fluid of flow paths 750, 752 absorbs heat from PCMs 702-718. Heat may then transfer from fluid of flow paths 750, 752 and into fluid of flow paths 728, 730 before exiting at outlet 758.

Stated slightly differently, a fluid temperature stabilization system may employ an exterior casing 102 defining an internal cavity, which may contain at least one (e.g. one or more pieces) phase change material, an inlet 104 located at a first end (e.g. a longitudinal end) of casing 102 to provide entry of a fluid into internal cavity where one or more PCMs 110-122 may reside, and an outlet 106 located at a second end (e.g. a longitudinal end) of casing 102 to provide an exit of the fluid from the internal cavity. The plurality of phase change materials 102-122 be are arranged such that contact on all sides of the plurality of phase change materials are made with fluid of flow path 108 that passes from inlet 104 to outlet 106. Phase change materials 102-122 may each be arranged in their own casing 124 or in a single casing 634, as depicted in FIG. 9. Individual PCMs may be arranged parallel to each other with respect to a longitudinal axis of each piece of PCM.

The fluid temperature stabilization system may further employ a single fluid or flow tube 536 that passes through exterior casing 512 at a first location 538 and a second location 540. A multitude of phase change materials 502, 504, 506, 508 may be located within the internal cavity of casing 512 and they may be arranged with their longitudinal axis, which may be coincident with a central axis of flow tube 536, parallel to each other. Single flow tube 536 may pass through a center of each of the phase change materials. By passing through a center of each of PCMs 502-508, heat absorption and heat expulsion by each PCM may be balanced with respect to each PCM.

Still yet, a fluid temperature stabilization system may employ a vehicle exhaust pipe 34, 66 a vehicle fresh air intake pipe 28, 42 and a cross pipe 44, 62 permitting fluid communication between the vehicle exhaust pipe and the vehicle fresh air intake pipe. Such a cross pipe may further employ a fluid temperature stabilizer, as depicted in at least FIGS. 3 and 5-10, that employs an exterior casing defining an internal cavity. At least one piece of phase change material may be located within the internal cavity. An inlet may be located at a first end of the casing providing entry of a fluid into the internal cavity and an outlet located at a second end of the casing providing exit of the fluid from the internal cavity.

A fluid temperature stabilization system may employ a plurality of pieces of phase change material and be arranged to permit the fluid to freely flow between each of the plurality of phase change materials from the inlet and the outlet, as depicted at least in FIG. 3. Moreover, each piece of the plurality of phase change materials are arranged parallel to each other.

Fluid temperature stabilization system may further employ a single fluid tube 536 that passes through exterior casing 512 at a first location 538 that is an inlet and that is different than a second location 540 that is an outlet. A plurality of pieces of phase change material may be located within the internal cavity defined by casing 512 and all pieces of phase change materials may be arranged parallel to each other with respect to a longitudinal axis of each piece. Fluid tube 536 may pass through a portion, such as a center section, of each phase change materials and be coincident with a longitudinal axis of each piece of material. Thus, in FIG. 8, dashed lines passing through each PCM may represent a longitudinal axis of each piece of PCM.

In another example, a fluid temperature stabilization system 600, 700 may employ a first casing 620, 720 defining an internal cavity, at least one phase change material 602, 702 located within the internal cavity, an inlet 622, 722 located at a first end of the first casing 620, 720 for providing entry of a first fluid 636, 736 into the internal cavity, an outlet 624, 724 located at a second end of the first casing 620, 720 for providing exit of the first fluid from the internal cavity, and a first valve 640, 740 located in the inlet 622, 722 to control flow of the first fluid. The fluid temperature stabilization system may further employ a second valve 642, 742 located in the outlet 624, 724 to control flow of the first fluid. The Fluid temperature stabilization system 600, 700 may employ a second casing 634, 734 that may contact and completely surround the at least one phase change material 602, 702. Fluid temperature stabilization system 700 may employ a third casing 752 located completely inside first casing 720 and completely outside second casing 734. Third casing 752 may define an internal cavity within which the second casing 734 and the at least one phase change material 702 may reside. First tube 754 may pass through first casing 720 and connect with third casing 752 to permit first tube 754 to transfer or deliver flow of a second fluid 756 into internal cavity of third casing 752. A second tube 758 may pass through first casing 720 and connect with third casing 752 to permit second tube 758 to transfer or deliver flow of a second fluid out of internal cavity of third casing 752. A third valve 762 may be located in first tube 754 to control fluid flow into the internal cavity of third casing 752, and a fourth valve 764 may be located in second tube 758 to control fluid flow 760 from the internal cavity of third casing 752. The first fluid and the second fluid do not mix with each other and may be circulated separately.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention. Example embodiments are provided so that this disclosure will be thorough, and will fully convey the scope to those who are skilled in the art.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A fluid temperature stabilization system comprising:
   an exterior casing having a first end wall, a second end wall, a first side wall, and a second side wall that define an internal cavity that extends along a longitudinal axis of the exterior casing from the first end wall to the second end wall;
   a plurality of internal casings disposed within the internal cavity, each internal casing having an upstream wall, a downstream wall, a third end wall, and a fourth end wall, the third end wall being proximate to the first side wall, the fourth end wall being proximate to the second side wall, the upstream and downstream walls extending between the third and fourth end walls transverse to the longitudinal axis of the exterior casing;
   a first phase change material located within a first one of the internal casings;
   a second phase change material located within a second one of the internal casings;
   an inlet located at the first end wall of the exterior casing providing entry of a fluid into the internal cavity; and
   an outlet located at the second end wall of the exterior casing providing exit of the fluid from the internal cavity;
   wherein:
   the first and second internal casings are staggered along the longitudinal axis such that the fluid flows in a flow path that proceeds from between the third end wall of the first internal casing and the first side wall, to between the downstream wall of the first internal casing and the upstream wall of the second internal casing, and then between the fourth end wall of the second internal casing and the second side wall; and
   the plurality of internal casings are arranged to promote contact of the fluid on all sides of the plurality of internal casings when the fluid flows between the inlet and the outlet.

2. The fluid temperature stabilization system of claim 1, wherein the plurality of internal casings are arranged parallel to each other with respect to their longitudinal axis.

3. A fluid temperature stabilization system comprising:
   a vehicle exhaust pipe;
   a vehicle fresh air intake pipe; and a cross pipe permitting fluid communication between the vehicle exhaust pipe and the vehicle fresh air intake pipe, the cross pipe further comprising:
an exterior casing having a first end wall, a second end wall, a first side wall, and a second side wall that define an internal cavity that extends along a longitudinal axis of the exterior casing from the first end wall to the second end wall;
a first internal casing and a second internal casing, the first and second internal casings being disposed within the internal cavity, the first internal casing having a first upstream wall, a first downstream wall, a third end wall, and a fourth end wall, the third end wall being proximate to the first side wall, the fourth end wall being proximate to the second side wall, the first upstream wall and the first downstream wall extending between the third and fourth end walls transverse to the longitudinal axis of the exterior casing, the second internal casing having a second upstream wall, a second downstream wall, a fifth end wall, and a sixth end wall, the fifth end wall being proximate to the first side wall, the sixth end wall being proximate to the second side wall, the second upstream wall and the second downstream wall extending between the fifth and sixth end walls transverse to the longitudinal axis of the exterior casing;
at least one piece of a first phase change material located within the first internal casing;
at least one piece of a second phase change material located within the second internal casing;
an inlet located at the first end wall of the exterior casing providing entry of a fluid into the internal cavity; and
an outlet located at the second end wall of the exterior casing providing exit of the fluid from the internal cavity; wherein:
the first internal casing is disposed between the second internal casing and the first end wall;
first and second internal casings are staggered such that the third end wall is spaced apart from the first side wall a greater distance than the fifth end wall, and the sixth end wall is spaced apart from the second side wall a greater distance than the fourth end wall;
the third end wall is a greater distance from the first side wall than the fourth end wall is from the second side wall, and the sixth end wall is a greater distance from the second side wall than the fifth end wall is from the first side wall;
the first and second internal casings are arranged within the internal cavity such that the fluid has a flow path that flows between the third end wall and the first side wall, between the first downstream wall and the second upstream wall, and then between the sixth end wall and the second side wall; and
the first and second internal casings are arranged to promote contact of the fluid on all sides of the first and second internal casings when the fluid flows between the inlet and the outlet.

4. The fluid temperature stabilization system of claim 3, wherein the plurality of internal casings are arranged to permit the fluid to freely flow between each of the plurality of internal casings from the inlet and the outlet.

5. The fluid temperature stabilization system of claim 3, wherein the plurality of internal casings are arranged parallel to each other.

6. A fluid temperature stabilization system comprising:
a first casing having a first end wall, a second end wall, a first side wall, and a second side wall that define a first internal cavity that extends along a longitudinal axis of the first casing from the first end wall to the second end wall;
a second casing defining a second internal cavity separate from the first internal cavity, the second casing preventing fluid communication between first and second internal cavities, the second internal casing having a second upstream wall, a second downstream wall, a third end wall, and a fourth end wall, the third end wall being between the first side wall and the fourth end wall, the second upstream wall and the second downstream wall extending between the third and fourth end walls transverse to the longitudinal axis of the first casing;
a third casing defining a third internal cavity separate from the first and second internal cavities, the third casing having a third upstream wall, a third downstream wall, a fifth end wall, and a sixth end wall, the fifth end wall being between the first side wall and the sixth end wall, the third upstream wall and the third downstream wall extending between the fifth and sixth end walls transverse to the longitudinal axis of the exterior casing;
at least one phase change material located within the second internal cavity;
at least one phase change material located within the third internal cavity;
an inlet located at the first end wall of the first casing for providing entry of a first fluid into the first internal cavity;
an outlet located at the second end wall of the first casing for providing exit of the first fluid from the first internal cavity; and
a first valve located in the inlet to control flow of the first fluid;
wherein:
the second and third casings are arranged such that the first fluid contacts the second and third casings when the first fluid flows between the inlet and the outlet;
the second and third casings are arranged such that the first fluid flows in a flow path that proceeds between the third end wall and the first side wall and between the sixth end wall and the second side wall and
the casings are arranged to promote contact of the fluid on all sides of the casings when the fluid flows between the inlet and the outlet.

7. The fluid temperature stabilization system of claim 6, further comprising:
a second valve located in the outlet to control flow of the first fluid.

8. The fluid temperature stabilization system of claim 1, wherein the first one of the internal casings is located upstream of the second one of the internal casings.

9. The fluid temperature stabilization system of claim 1, wherein the first phase change material is configured to change phase across a different range of temperatures than the second phase change material.

10. The fluid temperature stabilization system of claim 1, wherein the plurality of internal casings are arranged such that the fluid flows in a serpentine path around the internal casings between the inlet and the outlet.

11. The fluid temperature stabilization system of claim 1, further comprising a third phase change material located within a third one of the internal casings, the first, second, and third phase change materials being configured to change phases across different temperature ranges.

12. The fluid temperature stabilization system of claim 3, wherein the first one of the internal casings is located upstream of the second one of the internal casings.

13. The fluid temperature stabilization system of claim 3, wherein the first phase change material is configured to change phase across a different temperature range than the second phase change material.

14. The fluid temperature stabilization system of claim 3, wherein the plurality of internal casings are arranged such that the fluid flows in a serpentine path around the internal casings between the inlet and the outlet.

15. The fluid temperature stabilization system of claim 3, wherein the cross pipe further includes at least one piece of a third phase change material located within a third one of the internal casings, the first, second, and third phase change materials being configured to change phases across different temperature ranges.

16. The fluid temperature stabilization system of claim 6, wherein the second internal casing is located upstream of the third internal casing.

17. The fluid temperature stabilization system of claim 6, wherein the at least one first phase change material located within the second internal cavity is configured to change phase across a different temperature range than the at least one phase change material located within the third internal cavity.

18. The fluid temperature stabilization system of claim 6, wherein the second and third internal casings are arranged such that the first fluid flows in a serpentine path around the second and third casings between the inlet and the outlet.

19. The fluid temperature stabilization system of claim 6, further comprising:
   a fourth casing defining a fourth internal cavity separate from the first, second, and third internal cavities; and
   at least one phase change material located within the fourth internal cavity;
   wherein the at least one phase change materials located within the second, third, and fourth internal cavities are configured to change phase across different temperature ranges.

* * * * *